US010664804B2

(12) United States Patent
Ciccarelli

(10) Patent No.: US 10,664,804 B2
(45) Date of Patent: May 26, 2020

(54) COMPUTER-IMPLEMENTED METHOD OF FACILITATING ONLINE INTERACTIONS INVOLVING VOICE RECORDINGS USING MULTIPLE ELECTRONIC INTERFACES

(71) Applicant: David Ciccarelli, London (CA)

(72) Inventor: David Ciccarelli, London (CA)

( * ) Notice: Subject to any disclaimer, the term of this patent is extended or adjusted under 35 U.S.C. 154(b) by 0 days.

(21) Appl. No.: 15/211,918

(22) Filed: Jul. 15, 2016

(65) Prior Publication Data

US 2016/0328680 A1 Nov. 10, 2016

Related U.S. Application Data

(63) Continuation of application No. 12/591,485, filed on Nov. 20, 2009, now abandoned.

(51) Int. Cl.
*G06Q 10/10* (2012.01)
*G06Q 50/18* (2012.01)
*G06Q 30/06* (2012.01)
*G06Q 20/10* (2012.01)
*H04L 29/08* (2006.01)

(52) U.S. Cl.
CPC ......... *G06Q 10/1053* (2013.01); *G06Q 20/10* (2013.01); *G06Q 30/06* (2013.01); *G06Q 50/188* (2013.01); *H04L 67/02* (2013.01); *H04L 67/06* (2013.01); *H04L 67/10* (2013.01)

(58) Field of Classification Search
None
See application file for complete search history.

(56) References Cited

U.S. PATENT DOCUMENTS 5,884,270 A * 3/1999 Walker ............... G06Q 10/1053
379/93.12
7,069,242 B1 * 6/2006 Sheth .................... G06Q 30/06
705/37

(Continued)

FOREIGN PATENT DOCUMENTS

WO WO-03081381 A2 * 10/2003 ..... G06Q 10/063112

OTHER PUBLICATIONS

Voices.com, Find Professionals—Get Your Job Done: Surepay, Nov. 4, 2008, <http://www.voices.com/surepay.html>, Archived by Internet Wayback Archive Machine <https ://web .archive. org/web/20081020062535/http ://www.voices.com/surepay. html>, viewed, pp. 2 and 30-31.*

*Primary Examiner* — Minnah L Seoh
*Assistant Examiner* — Michael Young
(74) *Attorney, Agent, or Firm* — Nixon Peabody LLP

(57) ABSTRACT

Method of facilitating online interactions between voice talent users and second users. Voice talent users upload sample audio files containing voice recordings, and second users can do keyword searches for voice talent users or post jobs that can be searched by voice talent users. A second user sends a partial script to a voice talent user, who makes a voice recording of the partial script and uploads the same. The second user has the option to send a complete script to that voice talent user, and if so, the voice talent users makes a voice recording of the complete script and uploads the same as a final audio file. Upon acceptance of the final audio file and satisfaction of optional milestones established by the second user, a server remote from both users facilitates an electronic transaction between them using the server as an agent for the transaction.

10 Claims, 17 Drawing Sheets

(56) References Cited

U.S. PATENT DOCUMENTS

| | | | | |
|---|---|---|---|---|
| 7,421,391 B1* | 9/2008 | Merkel | ................... | G06Q 30/02 |
| | | | | 704/270 |
| 2003/0182171 A1* | 9/2003 | Vianello | .......... | G06Q 10/06311 |
| | | | | 705/7.14 |
| 2006/0026079 A1* | 2/2006 | Fox | .................... | G06Q 30/0641 |
| | | | | 705/27.1 |
| 2006/0284838 A1* | 12/2006 | Tsatalos | ............. | G06Q 10/0637 |
| | | | | 345/156 |
| 2008/0040141 A1* | 2/2008 | Torrenegra | ......... | G06Q 30/0601 |
| | | | | 705/26.1 |

* cited by examiner

Store — Your Cart

Store Search

[Search]

Store Directory
Television
Radio
Business
Telephone
Podcasts
Internet
Documentaries
Movie Trailers
Cartoons
Videogames
Audiobooks
e-Learning
Jingles
Music

Browse

Popular Tags
Tag 1
Tag 2
Tag 3
Tag 4
Tag 5
Tag 6
Tag 7
Tag 8
Tag 9
Tag 10

Product Name 1
{$username}|{$feedback}
Lorem ipsum dolor sit amet, consectetuer adipiscing elit.
more>
USD $100/hour
[Add to Cart]

Product Name 2 Lines
{$username}|{$feedback}
Lorem ipsum dolor sit amet, consectetuer adipiscing elit.
more>
USD $100/hour
[Add to Cart]

<Back | Next>

Newly Listed — View More>>

Product Name
{username}|{$feedback}
Lorem ipsum dolor sit amet, consectetuer adipiscing elit,sed diam nonummy nibh euismod tincidunt ut laoreet dolore erat volutpat.
more>
USD $100/hour    [Add to Cart]

Just Purchased — View More>>

Product Name
{username}|{$feedback}
Lorem ipsum dolor sit amet, consectetuer adipiscing elit,sed diam nonummy nibh euismod tincidunt ut laoreet dolore erat volutpat.
more>
USD $100/hour    [Add to Cart]

Recently Reviewed — View More>>

Product Name
{username}|{$feedback}
Lorem ipsum dolor sit amet, consectetuer adipiscing elit,sed diam nonummy nibh euismod tincidunt ut laoreet dolore erat volutpat.
more>
USD $100/hour    [Add to Cart]

Need Help?
1-888-359-3472

LIVE CHAT

About the Store
Lorem ipsum dolor sit amet, consectetuer adipiscing elit,sed diam nonummy nibh euismod tincidunt ut laoreet dolore erat volutpat.
Learn more>>

Why Voices.com?

$SurePay
Satisfaction Guaranteed!

Lorem ipsum dolor sit amet, consectetuer adipiscing elit,sed diam nonummy nibh euismod tincidunt ut laoreet dolore erat volutpat.
Learn more>>

Apple iPhone 3G Television Commercial

| Overview | Job Posting | My Audition | Files | Payments |

Job Details                    Milestones

Status  HIRING OPEN      Last Completed Step  {$jobID_last_step}
Job ID  {$jobID}                     Next Step  {$jobID_next_step}
Posted  {$jobID_posted_date}         Deadline   {$jobID_expiry_date}

Send Audition

From                              To

{$talent_first_name}{$talent_last_name}    {$client_first_name}
{$talent_email}                             {$client_last_name}
{$talent_phone}                             {$client_company_name}
http://{$talent_username}.voices.com

Proposal       See a Good Example
Select a Template  [▼]

Your Proposal  {$response_proposal}
Lorem ipsum dolor sit amet, consectetuer adipiscing elit,sed diam nonummy nibh euismod tincidunt ut laoreet dolore magna aliquam erat volutpat. Duis autem veil eum inure dolor in hendrerit in vulputate velit esse molestie consequat.

Lorem ipsum dolor sit amet, consectetuer adipiscing elit,sed diam nonummy nibh euismod tincidunt ut laoreet dolore magna aliquam erat volutpat. Duis autem veil eum inure dolor in hendrerit in vulputate velit esse molestie consequat.

☑ Save as template

Quote          What's This?

Your Fee          $ [0]        (Numbers only)
SurePay Escrow Fee $ 0
Client's Total    $ [0]        (Numbers only)

Demo
Upload New MP3  [          ] [Browse...]
              OR
Existing MP3    [          ▼]

[Send Audition] [Preview] [Cancel]

FIG. 5

Apple iPhone 3G Television Commercial

| Overview | Job Posting | My Audition | Files | Payments |

Job Details  Milestones

Status HIRING OPEN   Last Completed Step {$jobID_last_step}
Job ID {$jobID}                    Next Step {$jobID_next_step}
Posted {$jobID_posted_date}   Deadline {$jobID_expiry_date}

First Name Last Name

| Send Audition | Edit |

| ⚑ From | Demo | Quote | Date |
|---|---|---|---|
| 👤 {$username} | ▶ ⏹ ⏺ ▭▭▭▭<br>Download this file | $500 | 1 minute ago |

Proposal

{$response_proposal} Lorem ipsum dolor sit amet, consectetuer adipiscing elit,sed diam nonummy nibh euismod tincidunt ut laoreet dolore magna sit amet, consectetuer adipiscing elit,sed diam nonummy.

{$response_proposal} Lorem ipsum dolor sit amet, consectetuer adipiscing elit,sed diam nonummy nibh euismod tincidunt ut laoreet dolore magna sit amet, consectetuer adipiscing elit,sed diam nonummy.

Recent Clients                                                                                   Edit Lorem ipsum dolor sit amet, consectetuer adipiscing elit,sed diam nonummy nibh euismod tincidunt ut laoreet dolore magna aliquam erat volutpat.

Payment Methods

{$username} accepts the following methods of payment through Voices.com's SurePay Escrow service, that guarantees your satisfaction:

☐ ☐ ☐ ☐

Feedback

1. ★★★★★
   Lorem ipsum dolor sit amet, consectetuer adipiscing elit,sed diam nonummy nibh euismod tincidunt ut laoreet .
   Posted by: {$username}

| Send Audition | Edit |

FIG. 5A

Apple iPhone 3G Television Commercial

| Overview | Job Posting | My Audition | Files | Payments |

Job Details                          Milestones

Status  HIRING OPEN    Last Completed Step  {$jobID_last_step}
Job ID  {$jobID}                    Next Step  {$jobID_next_step}
Posted  {$jobID_posted_date}         Deadline  {$jobID_expiry_date}

Download Script

Download Script    Finalize Terms    Receive Deposit    Upload Files    Get Paid

●────────○────────●────────●────────●

Script

Congratulations! {$username} has awarded you the job. To move ahead, simply download the file, review it briefly, then click "Continue". A copy of the script is stored in your Files.

Attachment      Click here to download the script {$jobID_script_section1-10}
                Click here to download the script {$jobID_script_section 11-20}

What Happens Next?   After clicking "Continue", you'll be asked to finalize your Business Terms which includes establishing a Work Agreement and setting Milestones.

Apple iPhone 3G Television Commercial

| Overview | Job Posting | My Audition | Files | Payments |

Job Details  Milestones

Status FINALIZING TERMS  Last Completed Step {$jobID_last_step}
Job ID {$jobID}                              Next Step {$jobID_next_step}
Posted {$jobID_posted_date}     Deadline {$jobID_expiry_date}

Finalizing Business Terms

Download Script — Finalize Terms — Receive Deposit — Upload Files — Get Paid

Work Agreement for {$username} of {$company}

Why do I need an agreement? | Download a Template

Attach Agreement [                    ] [Browse....] +Add
File Attachments [{$file_location}] [Browse....] another file

Milestones   What's this?

1. Milestone Name [                    ]
Description [                    ]

Delivery Date [August ▼] [13 ▼] [2008 ▼]
Your Fee  $ [0                  ] (Numbers only)
SurePay Escrow Fee  $ 0
Client's Total  $ [0                  ]

2. Milestone Name [                    ]
Description [                    ]

Delivery Date [August ▼] [13 ▼] [2008 ▼]
Your Fee  $ [0                  ] (Numbers only)
SurePay Escrow Fee  $ 0
Client's Total  $ [0                  ]

+Add another Milestone

[Send Business Terms]  [Cancel]

FIG. 5C

Post Your Job

Job Details

Describe What You Need

Title of Project
Category
Language
Gender
Age Range
Union
Work Description   See a Good Example {$job_description}
Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat.

File Attachments   Browse...
Word Count of Script
Audio File Format
Budget Range   $100-$250   More Info
Response Deadline   August 13 2008

Tell Us About Yourself

Your Website
About Us   See a Good Example

{$account_description}
Lorem ipsum dolor sit amet, consectetuer adipiscing elit,sed diam nonummy nibh euismod tincidunt ut laoreet dolore magna aliquam erat volutpat. Duis autem veil eum inure dolor in hendrerit in vulputate velit esse molestie consequat.

Post Your Job

FIG. 6

Jobs

| | Hiring Open | Finalizing Terms | Working | Answered | Deleted |

Search Jobs: [          ] [Search]

| | Company | Budget | Status | Deadline |
|---|---|---|---|---|
| View ▶ | {$job_company} | $1000-$5000 | OPEN | {$job_date} |
| View ▶ | {$job_company} | $1000-$5000 | OPEN | {$job_date} |
| View ▶ | {$job_company} | $1000-$5000 | OPEN | {$job_date} |
| View ▶ | {$job_company} | $1000-$5000 | OPEN | {$job_date} |
| View ▶ | {$job_company} | $1000-$5000 | OPEN | {$job_date} |
| View ▶ | {$job_company} | $1000-$5000 | FINALIZING | {$job_date} |
| View ▶ | {$job_company} | $1000-$5000 | FINALIZING | {$job_date} |
| View ▶ | {$job_company} | $1000-$5000 | WORKING | {$job_date} |
| View ▶ | {$job_company} | $1000-$5000 | WORKING | {$job_date} |
| View ▶ | {$job_company} | $1000-$5000 | WORKING | {$job_date} |
| View ▶ | {$job_company} | $1000-$5000 | WORKING | {$job_date} |
| View ▶ | {$job_company} | $1000-$5000 | ANSWERED | {$job_date} |
| View ▶ | {$job_company} | $1000-$5000 | ANSWERED | {$job_date} |
| View ▶ | {$job_company} | $1000-$5000 | ANSWERED | {$job_date} |
| View ▶ | {$job_company} | $1000-$5000 | COMPLETED | {$job_date} |
| View ▶ | {$job_company} | $1000-$5000 | COMPLETED | {$job_date} |
| View ▶ | {$job_company} | $1000-$5000 | DELETED | {$job_date} |
| View ▶ | {$job_company} | $1000-$5000 | DELETED | {$job_date} |
| View ▶ | {$job_company} | $1000-$5000 | DELETED | {$job_date} |

Popup (over rows 2-4): Overview / Job Posting / My Audition Files / Payments

Showing 25 ▼ jobs per page

10
▼25
50
100

<Prev  1 [2][3][4][5][6][7] ... [Next>]

(2456 Jobs)

FIG. 6A

Apple iPhone 3G Television Commercial

| Overview | Job Posting | My Audition | Files | Payments |

Job Details　　　　　　　　　　Milestones

Status HIRING OPEN　　Last Completed Step {$jobID_last_step}
Job ID {$jobID}　　　　　　　　　　Next Step {$jobID_next_step}
Posted {$jobID_posted_date}　　　　Deadline {$jobID_expiry_date}

All Auditions　　　　　　　　My Audition

Responses {$invited_count}　　　　　Replied   Yes/Not Yet
Selected  {$selected_count}/Not Yet　Selected Yes/Not Yet

Messages

[Delete]　　　　Show Messages From: [▼]

| From | Subject | Date |
|---|---|---|
| ☐ {$username} | {$email_subject}<br>{$email_message}<br>Lorem ipsum dolor sit amet, consectetuer adipiscing elit,sed diamnonummy nibh euismod tincidunt ut laoreet dolore magna.<br><br>Lorem ipsum dolor sit amet, consectetuer adipiscing elit,sed diamnonummy nibh euismod tincidunt ut laoreet dolore magna.<br><br>http://www.voices.com/jobs/89055<br><br>[Reply] [Delete] | Aug 12, 2008 |
| ☐ {$username} | {$email_subject} | Aug 03, 2008 |
| ☐ {$username} | {$email_subject} | Jul 30, 2008 |
| ☐ {$username} | {$email_subject} | Jul 13, 2008 |
| ☐ {$username} | {$email_subject} | Jul 13, 2008 |

[Delete]　　　　　　　　Show 5 ▼ most recent items

▼5
10
25
All

FIG. 6B

Apple iPhone 3G Television Commercial

| Overview | Job Posting | My Audition | Files | Payments |

Job Details        Milestones

Status HIRING OPEN    Last Completed Step {$jobID_last_step}
Job ID {$jobID}                 Next Step {$jobID_next_step}
Posted {$jobID_posted_date}       Deadline {$jobID_expiry_date}

Job Posting

Key Information

Title of Project    {$job_title}
Category    {$job_category}
Language    {$job_language}
Gender    {$job_gender}
Age Range    {$job_age}
Union    {$job_union}
Format    {$job_file_format}
Work Count    {$job_word_count}
Budget    {$job_budget}

[ Reply to Job ]

- Print This Page
- Report Abuse
- Delete

Script Instructions

Job Description    {$job_description} Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat.
Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat.

File Attachments    ⁄ Download {$job_file_ID_title}

About {$account_company}

Contact    {$client_first_name}
About Us    {$client_account_description} Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat.

Back To Top

FIG. 6C

Apple iPhone 3G Television Commercial

| Overview | Job Posting | My Audition | Files | Payments |

Job Details  Milestones

Status WORKING         Last Completed Step {$jobID_last_step}
Job ID {$jobID}                     Next Step {$jobID_next_step}
Posted {$jobID_posted_date}        Deadline {$jobID_expiry_date}

Upload Files

Download Script — Finalize Terms — Receive Deposit — Upload Files — Get Paid

Deliver Files to {$username} of {$company}

1. Attachment [_____] [Browse....] Remove File
   File Name [_____]
   Description [{$file_description} Lorem ipsum dolor sit amet, consectetuer adipiscing elit,sed diamnonummy nibh euismod tincidunt ut laoreet dolore magna aliquam erat volutpat.]

2. Attachment [_____] [Browse....] Remove File
   File Name [_____]
   Description [{$file_description} Lorem ipsum dolor sit amet, consectetuer adipiscing elit,sed diamnonummy nibh euismod tincidunt ut laoreet dolore magna aliquam erat volutpat.]

+Add another File

[Upload Files]  [Cancel]

FIG. 6D

Verify

◻ Secure Checkout    Sign in    Work Order    Payment    Verify

Confirm Your Order

Billing Address

| | |
|---:|---|
| Address line 1 | {$address1} |
| Address line 2 | {$address2} |
| City | {$city} |
| State or province | {$state} |
| Postal/zip code | {$zip} |
| Country/Territory | {$country} |

Card Information

| | |
|---:|---|
| Form of payment | ☐ ☐ ☐ |
| Credit card number | {$cc_number} |
| Verification code | {$cc_verification_code} |
| Card holder's name | {$cic_cardholders_name} |
| Expiration date | {$cc_expiration_date} |
| Total | $500.00 |

1. Very Long Product Name Goes Here

| | |
|---:|---|
| Voice Talent | {$username} |
| Product # | {$product_ID} |
| Estimated Delivery Date | {$product_deliver_date} |
| Audio File Format | {$product_file_format} |
| Work Description | {$job_description} |

Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat, vel illum dolore eu feugiat nulla facilisis at vero eros et accumsan et justo odio dignissim qui blandit praesent luptatum augue duie dolore te feugait nulla facilisi.

File Attachments    {$product_ID-file_ID}
{$product_ID-file_ID}

2. Another Very, Very, Very, Very, Very Long Product Name Goes Here

| | |
|---:|---|
| Voice Talent | {$username} |
| Product # | {$product_ID} |
| Estimated Delivery Date | {$product_deliver_date} |
| Audio File Format | {$product_file_format} |
| Work Description | {$job_description} |

Lorem ipsum dolor sit amet, consectetuer adipiscing elit,sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem veil eum inure dolor in hendrerit in vulputate velit esse molestie consequat, vel illum dolore eu feugiat nulla facilisis at vero eros et accumsan et justo odio dignissim qui blandit praesent luptatum augue duie dolore te feugait nulla facilisi.

File Attachments    {$product_ID-file_ID}
{$product_ID-file_ID}

[ Place Order ]

FIG. 7

COMPUTER-IMPLEMENTED METHOD OF FACILITATING ONLINE INTERACTIONS INVOLVING VOICE RECORDINGS USING MULTIPLE ELECTRONIC INTERFACES

FIELD OF THE INVENTION

The present invention relates to online management systems. More specifically, the present invention relates to an online system for facilitating and managing transactions between voice talent and employers who wish to temporarily avail of the services of the voice talent.

BACKGROUND OF THE INVENTION

The present invention relates to online management systems. More specifically, the present invention relates to an online system for facilitating and managing transactions between voice talent and employers who wish to temporarily avail of the services of the voice talent.

The field of voice over recordings, voice acting, and voice recordings for use in automated answering systems and the like is one that is ideally suited for today's computerized world. Not only is the need for such services increasing but, due to the nature of the service, the voice talent (those who provide the voices for the recordings) do not even have to be in the same physical locality as their clients.

In this field, voice talent, the people who provide the voices for everything from answering machines to radio/Internet commercials to corporate video advertising material, are contracted on a per job or per contract basis. As an example, a voice talent may take on a contract to record all the names of the people in an organization for use in their voicemail system. The voice talent would be paid a flat fee for recording all the names and, depending on the conditions of the contract, the payment may be staggered based on milestones such as completing predetermined percentages of the job. Similarly, a voice talent may be contracted to record a predetermined script which an organization may use for its advertising material such as a video or a radio commercial.

However, while this field is suitable for having the voice talent in one location and having the client at another location, there is currently no systems that allow this paradigm to be used with the Internet. Not only would such a system allow for a broader base of voice talents but it would also speed up the process as voice talent can receive contracts faster and get paid quicker. As well, such a system would help potential employers to find the right talent for the right job and, because of the increased competition between the voice talent, pay a fair price for the job.

There is therefore a need for a system which incorporates current Internet based technologies with the needs of the voice industry.

SUMMARY OF INVENTION

The present invention provides systems and methods for facilitating online interactions between voice talent users and employer users. The online web-based system has an online store module, a voice talent database module, an open job database module, a negotiation module, and a payment module. The online system allows the employer users to search for a suitable voice talent user, preview the specific voice talent user's demonstration voice clip, and contact the voice talent user. The online store module allows the voice talent user to upload generic pre-recorded voice clips and which may be purchased and downloaded by employer users for their own purposes. The open job database allows employer users to upload contracts and jobs for which they need voice talent. The employer user may upload requirements for the contract, a sample of the script, and a payment range for the contract. Voice talent users may search and/or browse the open jobs database and they may respond to the posted open contract with a proposal by way of the negotiation module. The voice talent user may also upload a demonstration voice clip with their proposal to the relevant employer user by way of the negotiation. The payment module allows payment for completed contracts to be exchanged between employer users and voice talent users with the system administrator/operator as a go-between and as an escrow agent.

In one embodiment, the present invention provides an online system for facilitating transactions between voice talent users and employer users, the system comprising:

an online store module for storing pre-recorded sound files recorded by said voice talent users for purchase by said employer users;

a database module for storing in a database and managing information and demonstration sound files relating to voice talent users, said database being searchable by said employer users for voice talent users who meet predetermined criteria set by said employer users, said information and demonstration sound files for specific voice talent users being retrievable and accessible to said employer users;

an open job database module for storing in a job database and managing job information relating to contracts offered by said employer users for fulfillment by said voice talent users, said job database being searchable by said voice talent users;

a negotiation module for use in communications between said voice talent users and said employer users, said communications being related to said contracts, said negotiation module allowing at least one voice talent user to select a contract from said job database and to send a proposal regarding said contract to a relevant employer user, said negotiation module also allowing said relevant employer user to communicate an acceptance, rejection, or modification of said proposal to said voice talent user;

a payment module for receiving payment for pre-recorded sound files purchased using said online store module and for receiving contract payments from employer users for proposals which have been accepted by said employer user, said contract payments being released to relevant voice talent users upon completion of a milestone in a contract and upon approval by said employer user, wherein said system provides voice talent users an option to hide said voice talent user's true identity.

BRIEF DESCRIPTION OF THE DRAWINGS

The invention will be described with reference to the accompanying drawings, wherein

FIG. 3 is a view of the user interface for the online store module;

FIG. 4 is a view of the user interface for the database module;

FIG. 5 is a view of the voice talent interface for the negotiation module;

FIG. 5A is a view of a proposal as seen by an employer user;

FIG. 5B is a view of a screen for receiving a script once the contract has been awarded;

FIG. 5C is a view of the final agreement template;

FIG. 6 is a view of the user interface for posting a contract in the job database;

FIG. 6A is a view of search results for a search in the job database;

FIG. 6B is view of a sample job/contract description;

FIG. 6C is a view of a sample job/contract posting;

FIG. 6D is a view of an upload screen as a voice talent user uploads a finalized product to an employer user; and FIG. 7 is a view of the user interface for the payment module.

DETAILED DESCRIPTION OF THE INVENTION

Figure 1:
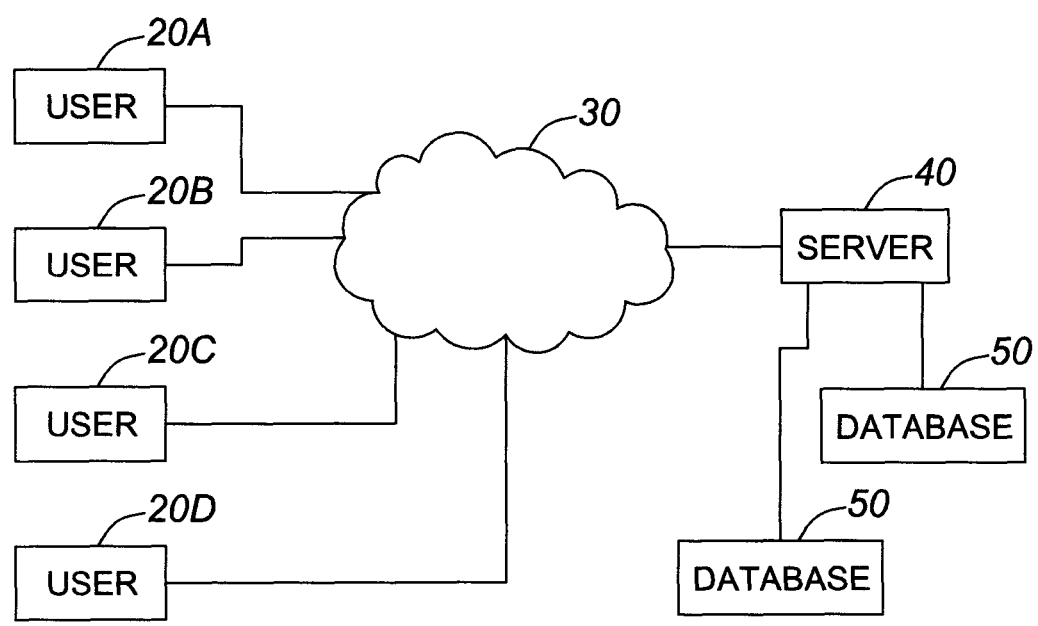
FIG. 1 illustrates a client-server system on which the invention can be practiced.

Referring to FIG. 1, a client server system 10 on which the invention can be practiced is illustrated. A number of user computers 20A, 20B, 20C, 20D individually connect to a network cloud 30. The user computers connect to at least one server 40 which is, in turn, coupled to at least one database 50. The user computers 20A, 20B, 20C, . . . 20n can be voice talent users or employer users.

It should be noted that the term "voice talent users" will be used to denote system users who are voice talent or those who provide voice based services to employer users. The term "employer users" will be used to denote system users who have need of the services of the voice talent users and who may need to purchase the products and services of the voice talent users.

Figure 2:
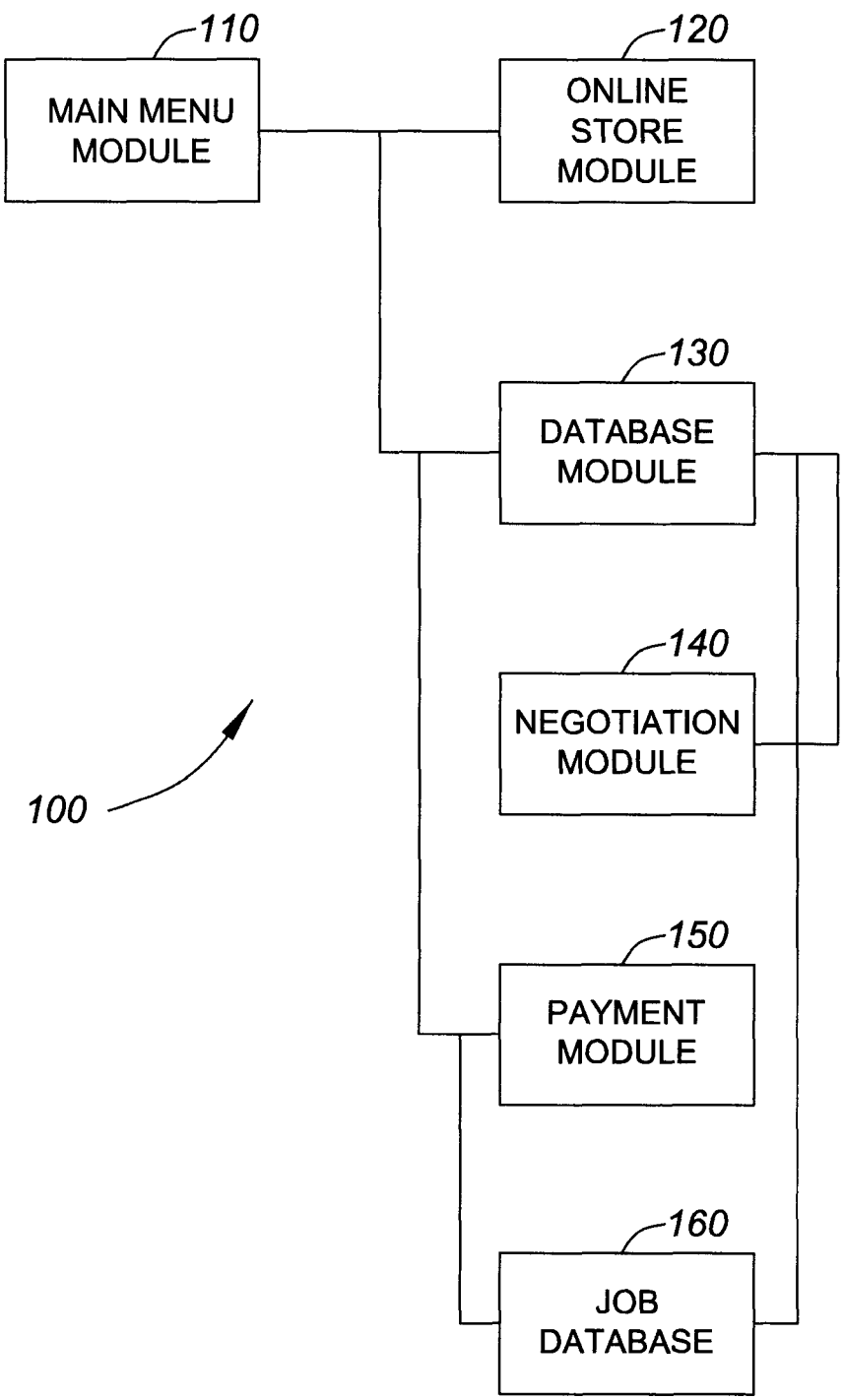
FIG. 2 is a modular view of one embodiment of the invention.

Referring to FIG. 2, a modular view of one embodiment of the invention is illustrated. A system 100 has a main menu module 110, an online store module 120, a database module 130, a negotiation module 140, a payment module 150, and a job database module 160.

The main menu module 110 is the first module encountered by any user who accesses the system. A registered user (one who has an account on the system) can access the online store module, the database module, and the jobs database module.

The online store module 120 provides the voice talent user with an opportunity to sell products that would be useful to employer users or to the general public. As an example, pre-recorded messages which can be used for telephone answering machines can be uploaded by voice talent users and be downloaded by other users for a fee. Similarly, other audio products, such as audiobooks narrated by the voice talent users, can also be uploaded by voice talent users and downloaded by other users.

The interface for the online store module allows the voice talent user to setup an online store for his or her merchandise. The merchandise is uploaded by the voice talent user. A description of the recording is then entered as well as a price. The voice talent user may also upload a small sample which a prospective buyer can download and listen to prior to purchasing the full recording.

Figure 3A:
FIG. 3A is a view of the search interface for the online store module.
Figure 3B:
FIG. 3B is a view of search results for the online store module.

The online store module, from the point of view of a user, can have an appearance akin to FIG. 3. As can be seen, the view is that of an online store for a specific voice talent user. His/her products are listed along with a description of the recording. The user can also listen to sample the recording by using the relevant controls on the webpage. As can be seen, multiple products are shown on the webpage. Products can be tagged by various keywords set either by the voice talent user who posts the recording or a system administrator.

A user wishing to purchase one of the products in the online store merely has to click on a button that adds the product to the user's virtual cart. The user can then pay for all of his or her purchases at a checkout page where all the purchases are added up and various payment options are presented.

Of course, multiple online store pages for multiple voice talent users may be implemented. To search for specific merchandise, a search function (see FIG. 3A) may be implemented that searches through the various products and their keywords. The search results are then presented to the user conducting the search and may be ranked according to relevance or any other predetermined criteria. (See FIG. 3B)

Figure 4:
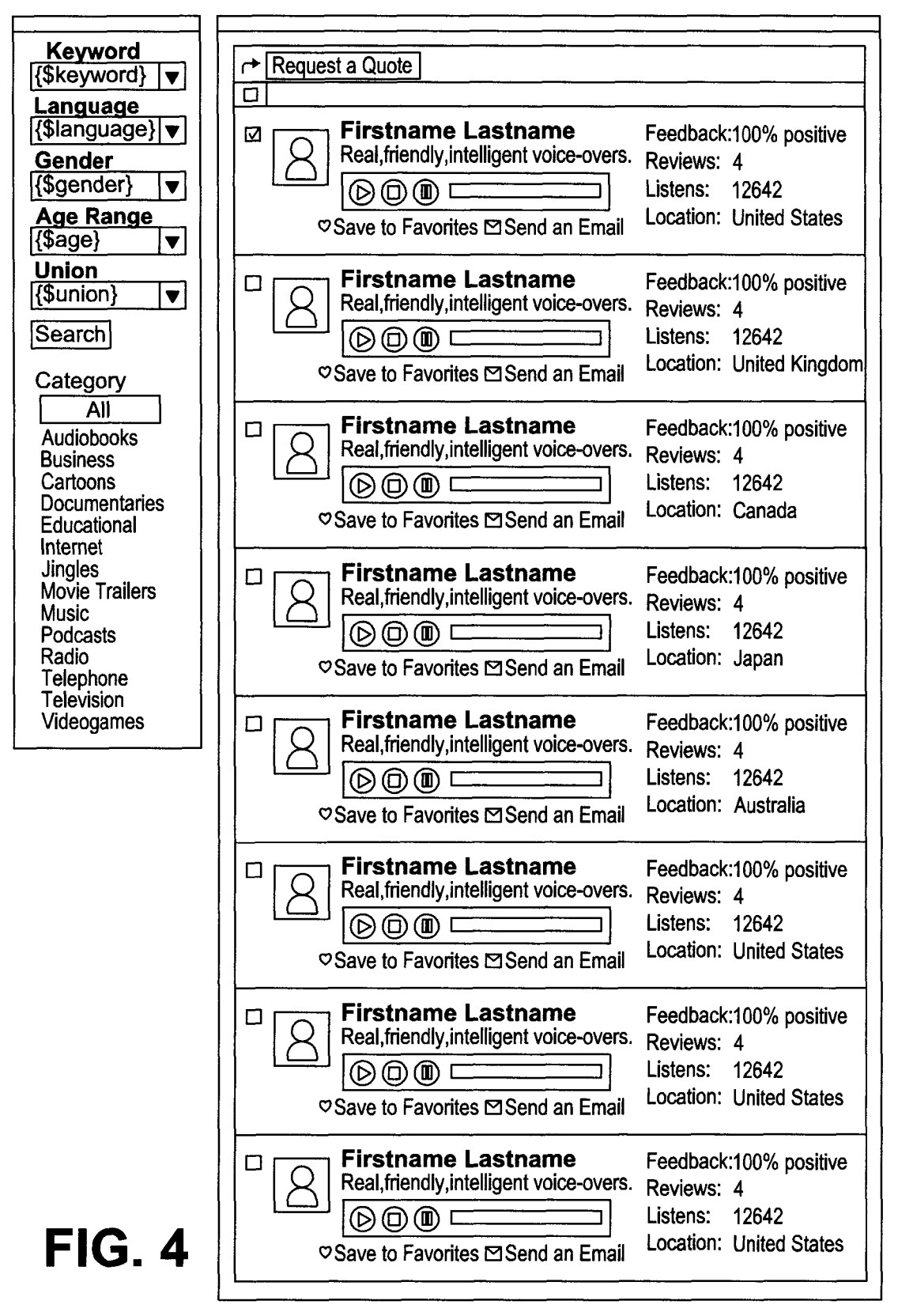

Referring to FIG. 4, a view of one interface for the database module is illustrated. Voice talent users can upload/create their profile. The voice talent user profile may include their previous experience, their specialties (e.g. specific accents they can do, specific age ranges they can do, specific languages they can speak, etc., etc.), a representative picture of themselves, feedback from employer users who have previously used their services, and at least one sample of their voice. Multiple samples can be placed in a voice talent user's profile if he/she wishes to highlight multiple specialities. As an example, a female voice talent user who specializes in radio commercials could have a sample showcasing a saucy teenaged upper crust English accent while another could showcase an elderly American woman from Boston. Each profile can be tagged by specific keywords that relate to the voice talent user and his/her specialty. From the previous example, this voice talent user may have her profile tagged with the keywords ENGLISH ACCENT, BOSTON, ELDERLY, TEEN, RADIO.

It should be noted that the voice talent user need not enter his/her real identity to be publicly viewable. A voice talent user's real name and address are, of course, required to be entered so that funds may be released to him/her as will be explained later.

To facilitate the search for a specific voice talent user, the database module has a search function. Employer users can enter keywords that summarize what they are looking for. The database module then searches the keywords in the profiles in the database and retrieves the profiles that have keywords that match the search. The search results may be ranked by relevance (e.g. profiles with the most keywords matching the search parameters are higher in the search results) or by any other predetermined criteria. As an example, if the system administrator wants to promote the uploading of samples from voice talent users, profiles without a sample may be left out of the search results. Similarly, voice talent users who have a paid up account may be ranked higher than those who are using a free account. Another way to rank the search results would be to rank users with a specific type of account higher than those with different accounts. As an example, a voice talent user with a higher rated account (e.g. a more expensive account) may be ranked higher in the search results than a voice talent user with a lower rated account. The database module ranks the voice talent users based on at least one of: a recency of a voice talent user's completion of a profile; a type of membership or account said voice talent user has in an organization hosting said online system; a number of positive comments regarding said voice talent user's fulfillment of contracts for employer users; and a presence or absence of a sound file of said voice talent user's voice.

The database module also includes entries for employer users. Employer users, before they can start posting job or contract openings, have to create a profile which may be viewed by voice talent users who may be considering contracts or jobs from the employer user. The employer user profiles would have information that supports the legitimacy of the employer user. As an example, the employer user's name (corporate name if it is a corporation), location, main line of business, contact information, and feedback from other voice talent users who have done work for them would be in the profile.

By way of the database module, employer users can contact specific voice talent users for possible jobs or contracts. It should also be noted that each employer user may designate one or more specific voice talent users as "favorites" who can be quickly contacted without having to search for them every time. Similarly, voice talent users may also designate specific employer users as "favorites". A user's favorites and other user-specific settings are stored in a user's private profile and is only available to that particular user when he/she logs in.

Once an employer user selects specific voice talent users who the employer user may want to use in a project, the employer user can then send an invitation to bid on the job/contract. The targeted aspect of the bidding will ensure that the employer user will only need to sift through a limited number of applicants. For the employer user to do this, he can call up a specific voice talent user's profile and invite that voice talent user to bid on a job/contract. The employer user attaches a portion of the script (or the whole script itself) to the invitation as well as a pay range for the job/contract and any other details that may be relevant to the job/contract. The pay range may be a specific dollar range or may be a specific dollar figure. The competition for the job/contract may be open (available to anyone registered on the website) or it may only be limited to those specifically invited by the relevant employer user.

Figure 5D:
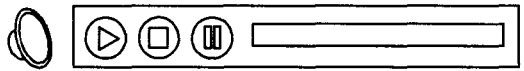
FIG. 5D is a proposal as seen by the voice talent user.

When the invitation is received by the voice talent user, the voice talent user can decide to send a proposal for the job/contract. For this, the voice talent user uses the negotiation module. (See FIG. 5 for the user interface) The negotiation module allows the voice talent user to respond to either an invitation to submit a proposal or to a posting from the jobs database. The voice talent user sends a proposal to the employer user that either sent the invitation or posted the job/contract. The proposal would cover the price for the contract, any conditions as to payment (perhaps partial payment with the completion of specific milestones), a time frame for the delivery of the final product, and possibly a sample of the final product if the employer user had attached a script with the job/contract posting. The voice talent user then sends the proposal to the relevant employer user. The employer user, once they receive the various proposals can then decide which proposals to pursue. For those proposals that they do not wish to pursue, they can send a generic notification to the voice talent user that the proposal was not accepted and that negotiations are closed. For those proposals that the employer user wishes to pursue (as the employer user may wish to have multiple proposals pending for the same job/contract), the employer user can send a counter proposal with changes to any of the conditions in the original proposal. Alternatively, the counter-proposal may have new conditions that were not present in the original proposal. This counter proposal is then sent to the relevant voice talent user for review. Once a voice talent user and the employer user agree on the terms of the proposal, then the final terms may be drawn up using a template contract/agreement. It should be noted that the template agreement may be part of the original proposal sent by the voice talent user to the employer user. If this is the case, then the employer user merely amends the agreement and the back and forth and the amendments between the two parties may continue until a final agreement is reached. (See FIG. 5A for a sample screen of a proposal as viewed by an employer user and see FIG. 5C for a sample screen of a final agreement template. Also, see FIG. 5D for the proposal as viewed by the voice talent user prior to submission)

If the employer user does not want to do a targeted invitation for a job/contract, he can post the job in the job database (see FIG. 6 for the user interface for posting a job). The job database has entries for open jobs/contracts for which employer users are looking for voice talent users. Each job database entry identifies the employer user posting the contract, the rate of pay for the contract (or a range of pay), the requirements of the contract (what specialties may be required such as specific voice age, accents, etc., etc.), a time frame for the completion of the contract, any conditions covering the payment (e.g. if partial payment is to be made upon the completion of specific milestones), and, if the employer user wishes, a sample of the script. The entries are also tagged by specific keywords derived from the type of contract, the rate of pay, the specialties required, time frame, and the employer user. Voice talent users who are looking for specific types of contracts can search the job database for specific keywords. As an example, a voice talent user who is looking for a contract that only involves recording the names of people in a directory for use in a voicemail system can search for the keyword VOICEMAIL in the job database. All the open/available entries in the job database that involves voicemail related contracts should then be presented to that voice talent user.

It should be noted that the search results from the job database may also be ranked using multiple criteria. The search results may be ranked by the pay range, the final product delivery time frame, by the employer user posting the contract, by the type of work required, by the requirements of the contract, or by any of the other characteristics of the contract. Of course, the voice talent user may also simply search for contracts posted by a specific employer user. (See FIG. 6A for a sample search result screen and see FIG. 6B for a sample job/contract description and see FIG. 6C for a sample job/contract posting)

Once the contract is awarded to a voice talent user, the employer user may send the full script. (See FIG. 5B) When the contract is fulfilled, the voice talent user can upload the final product (usually a sound file) to the system for delivery to the employer user (see FIG. 6D). The employer user can then pay the voice talent user using the payment module.

The payment module is how the voice talent user gets paid for the contracts fulfilled. Once a contract is fulfilled, the employer user deposits the funds with the organization hosting the online system or with a trusted third party. The employer user then authorizes the release of the funds to the voice talent user. (See FIG. 7 for the user interface)

Another possible scenario that may be used is to have the employer deposit the funds with the organization (using the payment module) or the trusted third party once the contract has been agreed upon. The voice talent user is then notified that the funds are there and that she/he can proceed with the contract. Once the contract is fulfilled and the employer user has received the final product, the employer user can then determine if the final product is suitable for their needs. If the final product is acceptable, then the employer user authorizes the release of the funds to the voice talent user. This scenario ensures to the voice talent user that the funds are there and that the employer user only requires the final product before releasing the funds.

A further scenario, again using the payment module, is to release funds upon the completion of specific milestones in the contract. The employer user may deposit either the full contract amount or specific portions of it with the organization hosting the online system or a trusted third party. Whenever the voice talent user fulfilling the contract finishes a previously agreed upon milestone (e.g. finishing a specific portion of the contract and delivering the portion to the employer user), then the employer user authorizes the release of the agreed upon portion of the payment. As an example, if an employer user needed a voice talent user to voice record 150 names for a voicemail system, the milestones can be once the voice talent user every third of the list. Thus, for the first fifty names recorded and delivered to the employer user, the employer user authorizes the release of one-third of the final agreed upon price. Once the second fifty names have been recorded and delivered to the employer user, the next third of the payment is released and so on. This ensures that the voice talent user does not have to wait until the end of what could be a long contract before getting paid.

The employer user can deposit funds with the organization using the payment module by using a credit card. If the funds are to be held in trust for a voice talent user, the organization (or a suitable third party) can act as an escrow agent for the funds and can charge the employer user a suitable fee for this service.

Once the contract has been fulfilled and payment has been released, both the voice talent user and the employer user can leave feedback for one another.

The method steps of the invention may be embodied in sets of executable machine code stored in a variety of formats such as object code or source code. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A computer-implemented method of facilitating online interactions between voice talent users and client users, where the online interactions include communication of electronic audio files created by the voice talent users to the client users via a computer server system over the Internet, the electronic audio files featuring voice recordings by respective ones of the voice talent users, the method comprising the steps of:

receiving connections over the Internet from voice talent users and client users to the server system;

storing in a database of the server system, for each of the voice talent users, a voice talent user profile uploaded by each of the voice talent users to the server system, the voice talent user profile including keywords inputted by the corresponding voice talent user and at least one sample electronic audio file featuring a sample voice recording of the corresponding voice talent user uploaded to the server system by the corresponding voice talent user, the keywords including a voice-related specialty of the corresponding voice talent user;

storing in a jobs database of the server system a plurality of entries posted by at least some of the client users, at least some of the entries including information about the client user who posted the entry and a corresponding sample of a script, the entries being tagged by keywords;

providing to the voice talent users by the server system over the Internet a first interface used by the voice talent users to create or upload their respective voice talent user profiles including the sample electronic audio files;

providing to the client users by the server system over the Internet a second interface including audio controls for listening to the sample electronic audio files uploaded by the voice talent users;

providing, by the server system via the Internet, a third interface used by the client users to input search parameters to search for those of the voice talent user profiles having at least one associated keyword relevant to the inputted search parameters;

ranking, by the server system, matching ones of the voice talent user profiles based on at least (a) a type of account of the corresponding voice talent users; and (b) a presence or absence of a sample electronic audio file in the matched voice talent user profiles;

downloading, by the server system, a plurality of voice talent search results to the third interface operated by one of the client users, each of the voice talent search results including a webpage control configured to playback the sample electronic audio file associated with the search result;

providing, by the server system over the Internet, a fourth interface used by the client users to post a job to the jobs database;

providing, by the server system via the Internet, a fifth interface used by the voice talent users to input search parameters to search for the plurality of entries posted by the client users having at least one tagged keyword relevant to the inputted search parameters to produce a jobs search results;

receiving, at the server system from the one of the voice talent users, a selection of one of a selected one of the jobs search results, and responsive thereto, downloading to the one of the voice talent users a sixth interface describing the selected one of the jobs search results and including a link on the sixth interface to download a portion of a complete script file prepared by one of the client users;

receiving, at the server system from one of the client users over the Internet, (a) a selection of one of the voice talent users and (b) a portion of a complete script file prepared and uploaded to the server system over the Internet by the one of the client users, the complete script file featuring a complete script, where the selected one of the voice talent users corresponds to one of the voice talent users that operated the fourth interface or to one of the voice talent users in the voice talent search results;

sending the portion of the complete script file from the server system to the selected one of the voice talent users over the Internet;

providing, by the server system, a seventh interface operated by the selected one of the voice talent users to upload over the Internet to the server system a sample electronic audio file of the portion of the complete script file featuring a voice recording of the portion of the complete script by the selected one of the voice talent users;

receiving at the server system the sample electronic audio file of the portion of the complete script file uploaded by the selected one of the voice talent users;

receiving, at the server system, from the one of the client users that prepared the portion of the complete script an instruction to send via the server system the complete script file to the selected one of the voice talent users;

providing a link to download from the server system the complete script file, the link being provided on the seventh interface operated by the selected one of the voice talent users;

providing, by the server system, an eighth interface operated by the selected one of the voice talent users to upload a final audio file featuring a voice recording of the complete script embodied in the completed script file;

receiving, by the server system from the selected one of the voice talent users, the final audio file;

delivering, by the server system, the final audio file to the one of the client users that prepared the complete script;

providing, by the server system, a ninth interface to the one of the client users that prepared the complete script;

responsive to delivering the final audio file, facilitating an electronic transaction between the one of the client users that prepared the complete script and the selected one of the voice talent users, with the server system acting as an agent for the electronic transaction, the ninth interface including an identifier identifying the final audio file, the selected one of the voice talent users that uploaded the final audio file, an indication of an audio file format of the final audio file, and input fields to complete the electronic transaction; and providing, by the server system, an option to the voice talent users to hide their real identity from being publicly viewable by the client users in the voice talent user profiles unless and until the electronic transaction occurs in response to delivering the final audio file.

2. The method of claim 1, wherein the ranking is further based on a presence of tags received from corresponding ones of the voice talent users.

3. The method of claim 1, further comprising the steps of:
responsive to receiving the sample electronic audio file of the portion of the complete script file from the selected voice talent user, receiving at the server system, via the first interface, a time frame within which or a time deadline by which the final audio file must be received, via the server system, by the client user that prepared the complete script, wherein the facilitating the electronic transaction includes confirming that the final audio file was received from the selected one of the voice talent users within the time frame or by the time deadline; and receiving, from the one of the client users that prepared the complete script at the server system, an indication to authorize the electronic transaction.

4. The method of claim 1, wherein the electronic transaction includes a plurality of electronic transactions, each of the plurality of electronic transactions being authorized in response to completion by a specified date by the selected one of the voice talent users of at least one milestone established between the selected one of the voice talent users and the one of the client users that prepared the complete script, wherein the completion of the at least one milestone includes uploading, by the selected one of the voice talent users, an audio file of a voice recording by the selected one of the voice talent users of part of the complete script by the specified date.

5. The method of claim 1, wherein the server system hosts all of the interfaces as the webpages over the Internet, the method comprising the steps of:
transmitting the third interface over the Internet to a web browser running on a client computer operated by one of the client users, wherein when the webpage control is selected, a sample audio recording associated with the search result is played on the client computer;

transmitting the seventh interface over the Internet to a web browser running on a voice talent computer operated by the one of the voice talent users, the seventh interface including at least one webpage having optionally at least one tab wherein the at least one webpage includes a browse control that allows one of the voice talent users to upload the sample electronic audio file of the portion of the complete script file, a webpage control that plays the uploaded sample electronic audio file, and the link to download the complete script file, the seventh interface including a job identifier associated with the complete script file;

transmitting the eighth interface over the Internet to the web browser running on the voice talent computer operated by one of the one of the voice talent users, the eighth interface including a browse control that allows the one of the voice talent users to upload the final audio file to the server system, and an upload control that when selected uploads the final audio file from the voice talent computer to the server system, the eighth interface including the job identifier; and transmitting the ninth interface over the Internet to the web browser running on the client computer operated by one of the client users, the identifier identifying the final audio file being associated with the job identifier.

6. The method of claim 1, wherein the server system includes at least one computer server coupled to the database.

7. The method of claim 1, wherein the final audio file includes a pre-recorded message by the one of the voice talent users voicing or narrating a script of the completed script file.

8. A computer-implemented method of centrally hosting on a central server system a plurality of electronic interfaces that are provided over the Internet among a plurality of client users and voice talent users to connect client users with human voice talent who provide voice-based services, the method comprising the steps of:

providing, from the central server system over the Internet to one of the client users, a first of the electronic interfaces including a first control to upload to a database system of the central server system a first electronic file that includes a portion of a complete script;

downloading, from the central server system over the Internet to one of the voice talent users, a second of the electronic interfaces including a link to download the first electronic file;

providing, by the central server system, a third of the electronic interfaces including a control to upload to the database system over the Internet to the central server system a sample electronic audio file featuring a voice recording by a human voice talent of the portion of the complete script;

providing, by the central server system, to the one of the client users a fourth of the electronic interfaces including a playback control configured to play the sample electronic audio file;

receiving, over the Internet at the central server system, a second electronic file that includes the complete script uploaded by the one of the client users and stored in the database system;

providing a link to the one of the voice talent users to download from the database system the second electronic file only in response to an instruction received at the central server system from the one of the client users over the Internet;

responsive to the one of the voice talent users accessing the link to download the second electronic file, providing a fifth of the electronic interfaces to the one of the voice talent users to upload a final audio file featuring a voice recording of the complete script by the human voice talent to the database system; and sending, over the Internet, the final audio file from the database system to the one of the client users.

9. The method of claim 8, further comprising:

storing in the database system, for each of the voice talent users, a voice talent user profile uploaded by each of the voice talent users to the server system, the voice talent user profile including keywords inputted by the corresponding voice talent user and at least one sample electronic audio file featuring a sample voice recording of the corresponding voice talent user uploaded to the server system by the corresponding voice talent user, the keywords including a voice-related specialty of the corresponding voice talent user;

storing in a jobs database of the central server system a plurality of entries posted by at least some of the client users, at least some of the entries including information about the client user who posted the entry and a corresponding sample of a script, the entries being tagged by keywords;

providing to the voice talent users by the central server system over the Internet a sixth interface used by the voice talent users to create or upload their respective voice talent user profiles including the sample electronic audio files;

providing to the client users by the central server system over the Internet a seventh interface including audio controls for listening to the sample electronic audio files uploaded by the voice talent users;

providing, by the central server system via the Internet, a search interface used by the client users to input search parameters to search for those of the voice talent user profiles having at least one associated keyword relevant to the inputted search parameters;

ranking, by the central server system, matching ones of the voice talent user profiles based on at least (a) a type of account of the corresponding voice talent users; and (b) a presence or absence of a sample electronic audio file in the matched voice talent user profiles.

10. The method of claim 9, further comprising:

providing, by the central server system, an option to each of the voice talent users to hide their real identity from being publicly viewable by the client users in the voice talent user profiles until after the final audio file is delivered.

* * * * *